United States Patent
Tamura et al.

(10) Patent No.: US 7,888,416 B2
(45) Date of Patent: Feb. 15, 2011

(54) METHOD FOR PRODUCTION OF ORGANIC-INORGANIC COMPLEX, ORGANIC-INORGANIC COMPLEX, AND POLYMERIC COMPOSITE MATERIAL

(75) Inventors: Kenji Tamura, Ibaraki (JP); Hirohisa Yamada, Ibaraki (JP); Hikaru Uno, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 469 days.

(21) Appl. No.: 12/090,415

(22) PCT Filed: Oct. 13, 2006

(86) PCT No.: PCT/JP2006/320497

§ 371 (c)(1),
(2), (4) Date: Apr. 16, 2008

(87) PCT Pub. No.: WO2007/046305

PCT Pub. Date: Apr. 26, 2007

(65) Prior Publication Data

US 2009/0227715 A1    Sep. 10, 2009

(30) Foreign Application Priority Data

Oct. 17, 2005    (JP) ............................. 2005-301605

(51) Int. Cl.
  C07F 7/02    (2006.01)
  C07F 7/10    (2006.01)
  C08K 5/16    (2006.01)
  C08K 5/54    (2006.01)
  C08K 5/56    (2006.01)
  C08L 101/00  (2006.01)

(52) U.S. Cl. ........................ 524/175; 556/9; 556/173; 556/410; 524/186; 524/188

(58) Field of Classification Search ............... 524/175, 524/186, 188; 556/9, 173, 410
See application file for complete search history.

(56) References Cited

U.S. PATENT DOCUMENTS 5,244,740 A    9/1993    Ou et al.

FOREIGN PATENT DOCUMENTS

| JP | 3-115114 A | | 5/1991 |
|---|---|---|---|
| JP | 03115114 A | * | 5/1991 |
| JP | 4-228416 A | | 8/1992 |
| JP | 9-87096 A | | 3/1997 |
| JP | 09087096 A | * | 3/1997 |
| JP | 2770409 B2 | | 7/1998 |
| JP | 2001-300305 A | | 10/2001 |

OTHER PUBLICATIONS

Pinnavaia et al. ("Polymer-Clay Nanocomposites"; 1st ed, Edited; Wiley Series in Polymer Science; Wiley: New York, 2000).*
G. W. Brindley et al; "Crystal Structures of Clay Mineral and their X-Ray Identification"; Edited by G.W. Brindleyand G. Brown, Mineralogical Society, London, 1980, pp. 46-49.
H. van Olphen; "For Clay Technologist, Geologists, and Soil Scientists"; Chap. 5 Clay Mineralogy, III. Illite (NONEXPANDIND2: 1LAYER CLAYS); 2nd ed, New York: Wiley, (1977) 68-69.
T. J. Pinnavaia et al; "Polymer-Clay Nanocomposites"; 1st ed, Edited; Wiley Series in Polymer Science; Wiley: New York, 2000.

* cited by examiner

*Primary Examiner*—Kelechi C Egwim
(74) *Attorney, Agent, or Firm*—Westerman, Hattori, Daniels & Adrian, LLP (57) ABSTRACT

Disclosed are: a method for production of an organic-inorganic complex by intercalation of a positively charged organic compound between layers of a non-swellable layered silicate which is believed to be difficult to achieve under convenient conditions; the organic-inorganic complex; and a layered silicate/polymer nanocomposite using the organic-inorganic complex. The method comprises: step (I) wherein a hydrous layered silicate having a hydroxyl group in its crystalline structure is heat-treated at a temperature not higher than 1,200° C. and lower than the phase transition temperature of the silicate to dehydrate the silicate; and step (II) wherein the dehydrated layered silicate is contacted with an aqueous solution of a positively charged organic compound.

12 Claims, 2 Drawing Sheets

METHOD FOR PRODUCTION OF ORGANIC-INORGANIC COMPLEX, ORGANIC-INORGANIC COMPLEX, AND POLYMERIC COMPOSITE MATERIAL

TECHNICAL FIELD

The present invention relates to a method for production of an organic-inorganic complex by intercalation of a positively charged organic compound between layers of a layered silicate, an organic-inorganic complex, and a polymeric composite material containing the organic-inorganic complex.

BACKGROUND ART

Layered silicates typified by clay minerals and mica minerals are classified in detail on the basis of the constituent elements and the layer charges thereof. The basic structure of the layers of layered silicate is primarily composed of a tetrahedral sheet and an octahedral sheet. In the tetrahedral sheet, tetrahedrons in which four $O^{2-}$ coordinate with a metal, e.g., silicon or aluminum, are bonded into a hexagonal network shape so as to form a sheet. In the octahedral sheet, octahedrons in which six $OH^-$ or $O^{2-}$ coordinate with a trivalent, divalent, or monovalent metal, e.g., aluminum, magnesium, or lithium, are joined sharing edges. This tetragonal sheet and the octagonal sheet are joined sharing apex oxygen. A layer in which one tetrahedral sheet is bonded to one octahedral sheet is referred to as a 1:1 layer, and a layer in which tetrahedral sheets are bonded to both sides of one octahedral sheet is referred to as a 2:1 layer.

Layered silicates having a 2:1 layer are classified on the basis of the magnitude of layer charge. Furthermore, a layered silicate in which divalent cations, e.g., $Mg^{2+}$, enter all site of the octahedral sheet can be classified into di-octahedral type, and a layered silicate in which trivalent cations, $Al^{3+}$, enter two sites and one site is vacant can be classified into tri-octahedral type. Regarding each of them, if a shortage of positive charge occurs in the octahedral sheet or the tetrahedral sheet because of substitution with metals having different valences, the charge of the entire layer becomes negative. An absolute value of charge (negative) of a layer with reference to an ideal chemical composition is referred to as a layer charge. Therefore, when a layer charge occurs, cations are required between the layers in order to keep a charge balance.

The layered silicates having 2:1 layers exhibiting layer charges within the range of 0.2 to 0.6 are referred to as smectite and there are di-octahedral smectite and tri-octahedral smectite. Montmorillonite, beidellite, nontronite, and the like are known as the di-octahedral smectite. Saponite, hectorite, stevensite, and the like are known as the tri-octahedral smectite. Smectite is a fine particle clay mineral, and has specific properties, e.g., the ion exchange ability manifested from the layer charge, the swellability, the dispersibility, and the intercalation function.

Examples of layered silicates having 2:1 layers exhibiting layer charges within the range of 0.6 to 1.0 include vermiculites; mica clay minerals typified by illite, sericite, glauconite, celadonite, and the like; and mica minerals typified by phlogopite, biotite, muscovite, palagonite, and the like. The crystallinity in directions of the a axis and the b axis is high and sheet area of each sheet is large as compared with a smectite crystal. However, nonexchangeable potassium ions are often included between the layers, and the swellability with water and the like are not exhibited in contrast to smectite.

Regarding mica clay minerals and mica minerals, in lamination of silicate layers, there are some azimuths of hydrogen bonds between tetragonal sheets and octagonal sheets and azimuths of displacement of tetragonal sheets sandwiching octagonal sheets, wherein the energy levels are equal but the crystalline structures are geometrically different depending on the azimuths. Therefore, three-dimensionally different crystalline structures may result depending on the azimuth of lamination chosen from possible azimuths. A different type of manner in regular lamination occurs on the basis of the difference in manner of stacking of the layers. This is referred to as a polytype (for example, Non-Patent Document 1).

On the other hand, examples of layered silicates having 2:1 layers which do not manifest a layer charge structurally include tri-octahedral talc and di-octahedral pyrophillite. They do not exhibit cation exchangeability. They do not swell with nor disperse in water in contrast to smectite. Talc is a tabular crystal, and is industrially used as fillers for polymeric materials and the like.

Regarding layered silicates having 1:1 layers, examples of di-octahedral type can include kaolin minerals of kaolinite, dickite, nacrite, and halloysite and examples of tri-octahedral type can include serpentine minerals, e.g., chrysotile and lizardite. These do not exhibit a layer charge. In kaolinite and dickite, 1:1 layers are laminated while being shifted by $-a/3$ from each other in the a axis direction of the crystal. At this time, the polytype occurs depending on the distribution of vacant positions of cations in the octahedrons resulting from lamination. Many polytypes occur regarding nacrite, chrysotile, and lizardite as well.

These layered silicates have been used previously in wide fields, e.g., potteries, refractories, castings, civil engineering, petroleum refining (catalyst), paper, medicines, cosmetics, and fillers for plastic. Recently, attempts to control the structure at a nanometer level and apply to functional materials have been conducted actively. In particular, regarding swellable layered silicates, e.g., smectite, the two-dimensionality, the layer charge, the ion exchangeability, and the self-assembly based on the interaction with organic molecules of them are used well and the layered silicates are used for special, industrial purposes, e.g., intermediate compounds and polymer-clay nanocomposites.

For example, various cationic coloring agents are intercalated into smectite, and the resulting organic-inorganic complexes can be used as color couplers of thermal transfer color printers taking advantage of the color development action thereof (Patent Document 1). An inorganic nanosheet-dispersion complex system of nanometer level is obtained by combining organic-inorganic complex, in which an organic cation is intercalated into smectite or swellable fluorine mica, with a polymer, so that a layered silicate-polymeric nanocomposite having dramatically improved heat resistance, rigidity, and gas barrier property of the material can be obtained (Non-Patent Document 3). The application of the nanocomposite has been developed in various purposes.

In general, among the above-described layered silicates, smectite is one of clay minerals and it is easy to intercalate organic molecules between layers thereof so as to form an organic-inorganic complex. The smectite exhibits the swellability and has exchangeable cations between layers and, therefore, can be combined with various organic molecules and polymeric materials. However, the smectite is the smallest inorganic fine particle polycrystal in the soil, and the primary particle diameter is specified to be 2.0 μm or less (refer to "Nendo Handobukku (Clay Handbook)" second edition, edited by the Clay Science Society of Japan, Section 1 to Section 6, GIHODO SHUPPAN), and the lamination thereof exhibits significant irregularity.

In the X-ray diffraction, only broad two-dimensional reflection (hk band) is observed except the bottom surface reflection. Therefore, the smectite is believed to be a two-dimensional crystal not having a three-dimensional structure due to regular lamination. The synthetic fluorine mica exhibiting swellability with water and the like similarly to the smectite has crystallinity of the layer surface in the a axis and the b axis directions higher than that of the smectite, and the sheet area per sheet is larger. However, a fine particle crystal results as compared with mica minerals, mica clay minerals, vermiculites, talc, pyrophillite, kaolin minerals, and the like.

The swellable layered silicates, e.g., smectite and swellable fluorine mica, easily form organic-inorganic complexes by an ion exchange reaction. However, among the above-described non-swellable layered silicates, for example, regarding mica clay minerals and mica minerals, potassium ions fit into an oxygen six-membered ring on the two, i.e. upper and lower, silicate sheet surfaces, and the non-swellability is induced on the basis of the electrostatic cross-linking effect thereof (Non-Patent Document 2).

Non-Patent Document 1: Crystalline structures of clay minerals and their X-ray identification, Edited by G. W. Brindley and G. Brown, Mineralogical Society, London, 1980.

Non-Patent Document 2: H. van Olphen, Chap. 5 Clay Mineralogy, III.ILLITE (NONEXPANDIND 2:1 LAYER CLAYS), In "An Introduction to Clay Colloid Chemistry: for clay technologists, geologists, and soil scientists" 2nd ed, New York: Wiley, (1977) 68-69.

Non-Patent Document 3: Polymer-Clay Nanocomposites, 1st ed, Edited by Pinnavaia, T. J.; Beall, G. W.; Wiley Series in Polymer Science; Wiley: New York, 2000.

Patent Document 1: Japanese Patent No. 2770409

DISCLOSURE OF INVENTION

Problems to be Solved by the Invention

The layered silicates having 2:1 layers exhibiting no layer charge (talc, pyrophillite) and the layered silicates having 1:1 layers (kaolinite minerals, serpentine minerals) include no cation to exchange between layers, and silicate sheets are bonded to each other by a hydrogen bond. Therefore, it is difficult to intercalate a long chain organic substance between the layers, in contrast to the above-described layered silicate including potassium between the layers. In particular, there is almost no report describing that an organic molecules are intercalated into talc or pyrophillite.

Regarding the application of the organic-inorganic complex to a polymeric composite materials, there are fields in which excellent mechanical properties and an excellent gas barrier property are required. In this case, it is believed that effects of improving the rigidity, the barrier property, and the like are enhanced as the aspect ratio of the dispersion layer increases. Therefore, a nanocomposite including a layered compound having an aspect ratio larger than those of the smectite and the swellable fluorine mica has been desired.

The present inventors filed an application for patent of the invention related to a nanocomposite having a high aspect ratio, which had not been reported previously, based on peeling of non-swellable mica having large crystal grains, which was a system not attempted previously (Japanese Patent Application No. 2004-248134). In order to respond to diverse demands from the market and the society, development of technologies taking advantage of not only the swellable layered silicates, e.g., smectite, but also various host layered substances is indispensable.

The present invention is to provide a method for production of an organic-inorganic complex by intercalation of a positively charged organic compound between layers of a non-swellable layered silicate which is believed to be difficult to achieve under convenient conditions, the organic-inorganic complex, and a layered silicate/polymer nanocomposite by using the organic-inorganic complex.

Means for Solving the Problems

The present inventors conducted intensive research on the above-described problems. As a result, it was found that a positively charged organic compound was easily intercalated between layers by heat-treating a non-swellable layered silicate so as to dehydrate and, thereby, an organic-inorganic complex was able to be formed. The present invention has been made on the basis of this finding.

That is, the present invention relates to a method for producing an organic-inorganic complex by allowing a non-swellable layered silicate dehydrated through a heat treatment at a dehydration temperature not higher than 1,200° C. to contact a positively charged organic compound, an organic-inorganic complex produced by the above-described method, and a polymeric composite material containing the organic-inorganic complex. That is, the present invention is composed of the configurations described in the following items [1] to [12].

[1] A method for producing an organic-inorganic complex by intercalation of a positively charged organic compound between layers of a layered silicate, the method characterized by including the steps of heat-treating a hydrous layered silicate having a hydroxyl group in its crystalline structure at a temperature not higher than 1,200° C. and lower than the phase transition temperature of the silicate to dehydrate the silicate in Step (I); and allowing the dehydrated layered silicate to contact an aqueous solution containing a positively charged organic compound in Step (II).

[2] The method for producing an organic-inorganic complex according to the item [1], characterized in that the above-described hydrous layered silicate having a hydroxyl group in its crystalline structure is represented by the following general formula (1):

(1)

(where $0.2 \leq a \leq 1.0$, $0 \leq b \leq 0.1$, $0 \leq c \leq 3$, $0 \leq d \leq 2$, $2 \leq c+d \leq 3$, $0 \leq e < 4$, and $0.6 \leq f \leq 2$ are satisfied, M is a cation other than K present between layers and is at least one of Li, Na, Rb, Cs, $NH_4$, Be, Mg, Ca, Sr, Ba, Mn, Fe, Ni, Cu, Zn, and Al, $M^1$ and $M^2$ are metals which enter an octahedron coordinating with $O^{2-}$ and $OH^-$ and constituting the crystalline structure of the hydrous layered silicate, $M^1$ is at least one of Mg, Fe, Mn, Cu, Ni, Zn, and Li, and $M^2$ is at least one of Al, Fe, Mn, and Cr).

[3] The method for producing an organic-inorganic complex according to the item [2], characterized in that the layered silicate having a hydroxyl group in its crystalline structure is a layered silicate belonging to any one of groups of vermiculites, mica, mica clay minerals, brittle mica, and chlorite.

[4] The method for producing an organic-inorganic complex according to the item [1], characterized in that the above-described layered silicate having a hydroxyl group in its crystalline structure is represented by the following general formula (2) or general formula (3):

$$(Mg_{3-e}M^3_e)(Si_{4-f}Al_f)O_{10}(OH)_2 \qquad (2)$$

$$(Al_{2-g}M^4_g)(Si_{4-h}Al_h)O_{10}(OH)_2 \qquad (3)$$

(In the formula, $M^3$ represents one type selected from metal elements of iron, aluminum, manganese, chromium, nickel, zinc, cobalt, titanium, calcium, sodium, and potassium, $M^4$ represents one type selected from metal elements of $Fe^{2+}$, $Fe^{3+}$, Mg, and Ti, and e, f, g, and h are numbers satisfying the relationships of $0 \leq e \leq 2$, $0 \leq f \leq 1$, $0 \leq g \leq 1$, and $0 \leq h \leq 1$).

[5] The method for producing an organic-inorganic complex according to the item [4], characterized in that the above-described layered silicate having a hydroxyl group in its crystalline structure is a layered silicate belonging to any one of groups of talc and pyrophillite.

[6] The method for producing an organic-inorganic complex according to the item [1], characterized in that the above-described layered silicate having a hydroxyl group in its crystalline structure is represented by the following general formula (4) or general formula (5):

$$Al_2Si_2O_5(OH)_4 \qquad (4)$$

$$Mg_3Si_2O_5(OH)_4 \qquad (5)$$

[7] The method for producing an organic-inorganic complex according to the item [6], characterized in that the layered silicate having a hydroxyl group in its crystalline structure is a 1:1 type layered silicate typified by a kaolin mineral or a serpentine mineral.

[8] The method for producing an organic-inorganic complex according to the item [1], characterized in that the above-described positively charged organic compound is at least one type selected from primary amines, secondary amines, and tertiary amines, each having the carbon number of 8 to 150, and salts thereof; quaternary ammonium salts; and amine compounds, amino acid derivatives, and nitrogen-containing heterocyclic compounds and salts thereof.

[9] An organic-inorganic complex produced by the method according to the above-described item [1].

[10] The organic-inorganic complex according to the above-described item [9], characterized in that the above-described organic-inorganic complex has a mixed layer structure formed by laminating layers (A) in which a positively charged organic compound is intercalated and layers (B) in which a positively charged organic compound is not intercalated.

[11] A polymeric composite material characterized by comprising 0.1 to 40 percent by mass of the organic-inorganic complex according to the above-described item [9] as a filler in a polymeric material.

[12] The polymeric composite material according to the above-described item [11], characterized in that the above-described layers, in which a positively charged organic compound is intercalated, of the organic-inorganic complex are peeled in the polymeric material and layered silicate layers are dispersed while distances between particles are 3.0 nm or more.

Most of the layered silicates serving as host substances of the organic-inorganic complex according to the present invention are non-swellable and the sizes of particles are relatively large. The organic-inorganic complex in which a positively charged organic compound is intercalated in these hosts can easily be obtained by using the production method according to the present invention.

Even the mica having a large particle size is easily be made into flakes. Therefore, regarding cosmetic purposes, for example, it is possible to apply to an additive for milky lotion which does not easily precipitate even in a solution and which exhibits excellent masking property and smoothness. The use as a filler for plastic can prepare a nanocomposite in which silicate sheets having large aspect ratios are dispersed. This nanocomposite can be expected to have excellent mechanical properties and high gas barrier property and, therefore, is useful for structural materials and various barrier members.

Advantages

The present invention realizes a method for easily intercalating a positively charged organic compound into a layered silicate, while the layered silicate exhibits poor swellability and, therefore, it has been believed to be difficult to obtain an organic-inorganic complex therefrom previously. Regarding the organic-inorganic complex used in the present invention, the original layered silicate is freely selected. Therefore, the layered silicate can be selected in accordance with purposes and uses.

For example, if organic-inorganic complexes based on highly crystalline mica minerals are combined with polymers, dispersion systems with aspect ratios still larger than that of the known smectite based nanocomposite can be obtained. These materials are expected to have excellent mechanical properties and a high gas barrier property. Furthermore, an organic-inorganic hetero lamination compound is obtained by combining the kaolin mineral having a 1:1 layer with a functional organic molecule, so that the function of the organic molecule can be controlled.

BEST MODES FOR CARRYING OUT THE INVENTION

The crystalline structures of layered silicates include two types, i.e. a silica tetrahedron in which oxygen atoms are arranged to form a tetrahedron centering silica and an aluminum hydroxide hexahedron in which oxygen and hydrogen atoms (hydroxyl groups) or merely oxygen atoms form an octahedron centering aluminum or the like. One layer of the layered silicate crystal of the present invention is composed of two tetrahedral layers and one octahedral layer, and this is referred to as a 2:1 sheet. In the present invention, a hydroxyl group present in the crystalline structure of the hydrous layered silicate may be referred to as structural water, is present as $(OH)^-$ in a lattice, and is released as $H_2O$ by heating in the air ("Chigaku Jiten (Earth Science Dictionary)" Eleventh edition, The Association for the Geological Collaboration in Japan, edited by Chigaku Jiten Henshuu Iinkai (Earth Science Dictionary Editorial Committee) page 362 Heibonsha Limited). In the hydrous layered silicate, the apex oxygen of the tetragonal sheet is shared with the octagonal sheet and, thereby, those sheets are bonded. Since there is no oxygen at the center of a hexagon of a hexagonal network with oxygen apexes, $OH^-$ enters into the center and an octahedron is formed. The hydroxyl group in the crystalline structure is generated as described above and serves an important function regarding the physical and chemical properties of the hydrous layered silicate.

The basic unit of the crystalline structure of the mineral is a unit cell, and expression in the total number of elements included in a unit cell is easy-to-understand ("Nendo Kagaku eno Shoutai Nendo no Sugao to Miryoku (Invitation to Clay Science True Face and Appeal of Clay)" edited by Sudo

Danwakai (Sudo Meeting) SANKYO PUBLISHING Co., Ltd.). Regarding the 2:1 type layered silicate, the number of oxygen in ½ unit cell is 10, and the number of hydroxyl groups at that time is 2 at the maximum. Regarding the 1:1 type layered silicate, in addition to that, all the octahedral sheet surface becomes OH⁻. Therefore, the number of hydroxyl groups is a large 4 relative to the number of oxygen of 5. Examples of hydrous layered silicates having a hydroxyl group in the crystalline structure include kaolin minerals, mica minerals, mica clay minerals, clay minerals, and mixed layer minerals thereof.

Preferably, the step of dehydrating the hydrous layered silicates having a hydroxyl group in the crystalline structure is a heat treatment at a temperature not higher than 1,200° C., and a temperature in the vicinity of the dehydration temperature of crystal water of each hydrous layered silicate is preferable. If the temperature exceeds 1,200° C., unfavorably, another mineral may be formed because of the phase transition. Since the dehydration temperature is varied depending on the composition and the crystallinity of the layered silicate, it is necessary that the dehydration temperatures of individual hydrous layered silicates are checked in advance by a thermogravimetric measurement or the like. It is preferable that the structural water is completely dehydrated within the bounds of not effecting the phase transition. If this is insufficient, proceeding of intercalation of the organic molecules may be delayed.

As for the guideline of the heat treatment, in the case of di-octahedral layered silicates, e.g., kaolinite, nacrite, nontronite, di-octahedral vermiculite, illite, muscovite, and pyrophillite, a preferable range is 400° C. to 800° C., and in the case of tri-octahedral layered silicates, e.g., antigorite, tri-octahedral vermiculite, phlogopite, biotite, and talc, a preferable range is 600° C. to 1,000° C. In each case, the temperature must be lower than the phase transition temperature of the silicate.

An ion exchange reaction in which the positively charged organic compound is intercalated between layers of a non-swellable layered silicate is conducted by allowing a powder of dehydrated layered silicate to contact an aqueous solution of the positively charged organic compound, so that, the layered silicate takes the positively charged organic compound between layers together with the condensate of the structural water to form an interlayer compound. Regarding the contact between the layered silicate powder and the positively charged organic compound, it is preferable that agitation is conducted satisfactorily and the system is allowed to come into a homogeneously mixed state. Heating up to 40° C. or higher is preferable because the reaction proceeds more uniformly.

The hydrous layered silicate which is used in the present invention and which has a hydroxyl group in its crystalline structure is represented by the following general formula (1).

(1)

In the formula, $0.2 \leq a \leq 1.0$, $0 \leq b \leq 0.1$, $0 \leq c \leq 3$, $0 \leq d \leq 2$, $2 \leq c+d \leq 3$, $0 \leq e < 4$, and $0.6 \leq f \leq 2$ are satisfied, M is a cation other than K present between layers and is at least one of Li, Na, Rb, Cs, NH₄, Be, Mg, Ca, Sr, Ba, Mn, Fe, Ni, Cu, Zn, and Al, $M^1$ and $M^2$ are metals which enter an octahedron formed in a 2:1 sheet, that is, an octahedron coordinating with $O^{2-}$ and $OH^-$ and constituting the crystalline structure of the hydrous layered silicate, $M^1$ represents at least one of Mg, Fe, Mn, Cu, Ni, Zn, and Li, and $M^2$ represents at least one of Al, Fe, Mn, and Cr.

Specific examples of the hydrous layered silicate which is represented by the above-described general formula and which has a hydroxyl group in its crystalline structure include smectite typified by montmorillonite, beidellite, nontronite, saponite, hectorite, and stevensite; mica, e.g., muscovite, phlogopite, biotite, margarite, and clintonite; and vermiculites which are alteration minerals thereof, e.g., di-octahedral vermiculites and tri-octahedral vermiculites; and mica clay minerals, e.g., illite, sericite, glauconite, and celadonite, which are hydrous layered silicates exhibiting layer charges of 0.2 to 1.0 and having 2:1 layers. Polytypes are present regarding mica minerals and mica clay minerals.

The layer charge of an easily ion exchangeable layered silicate, e.g., smectite, can be estimated by a measurement of the amount of interlayer ions. Examples of methods for actual measurement include a method for measuring a cation exchange capacity (CEC) applied to swellable clay minerals: a column permeation method (refer to "Nendo Handobukku (Clay Handbook)" second edition, edited by the Clay Science Society of Japan, pages 576-577, GIHODO SHUPPAN), a methylene blue adsorption method (Japan Bentonite Manufacturers Association Standard, JBAS-107-91), and the like. However, this cannot be applied to non-swellable layered silicates having potassium ions between layers. The layer charges of those layered compounds are estimated on the basis of the chemical composition analysis. Specifically, inductively coupled plasma emission spectrometry (ICP), X-ray fluorescence analysis (XRF), electron probe X-ray microanalyzer (EPMA), and the like are used.

The 2:1 type hydrous silicate which is used in the present invention and which exhibits no layer charge is represented by the following general formula (2) or (3).

(2)

(3)

In the formula, $M^3$ represents one type selected from metal elements of iron, aluminum, manganese, chromium, nickel, zinc, cobalt, titanium, calcium, sodium, and potassium, $M^4$ represents one type selected from metal elements of $Fe^{2+}$, $Fe^{3+}$, Mg, and Ti, and e, f, g, and h are numbers satisfying the relationships of $0 \leq e \leq 2$, $0 \leq f \leq 1$, $0 \leq g \leq 1$, and $0 \leq h \leq 1$.

Regarding these hydrous layered silicate, nothing is present between the layers, and bottom oxygen surfaces are bonded to each other with a van der Waals force. The bottom surface distance (in the lamination direction of the silicate, c axis period) is 0.92 to 0.93 nm. Specific examples thereof can include talc and pyrophillite.

The 1:1 type hydrous layered silicate which is used in the present invention and which exhibits no layer charge is represented by the following general formula (4) or (5).

(4)

(5)

The silicates represented by the formula (4) are referred to as kaolin minerals which are di-octahedral 1:1 type layered silicate, and four types, i.e. kaolinite, dickite, nacrite, and halloysite, can be included. The silicates represented by the formula (5) are referred to as serpentine minerals which are tri-octahedral 1:1 type layered silicate, and three types, i.e. chrysotile, lizardite, and antigorite can be included. Polytypes are present regarding kaolinite, dickite, nacrite, chrysotile, and lizardite.

The organic-inorganic complex according to the present invention is obtained by intercalating organic cations into the above-described specific non-swellable layered silicate. The type of positively charged organic compound to be used for the present invention is not specifically limited. Preferable examples thereof include primary amines, secondary amines, and tertiary amines, each having the carbon number of 8 to 150, and salts thereof, quaternary ammonium salts, amine compounds, amino acid derivatives, nitrogen-containing heterocyclic compounds, and salts thereof.

Specific examples thereof include primary amines typified by octylamine, laurylamine, tetradecylamine, hexadecylamine, stearylamine, oleylamine, acrylamine, benzylamine, and aniline; secondary amines typified by dilaurylamine, ditetradecylamine, dihexadecylamine, distearylamine, and N-methylaniline; tertiary amines typified by dimethyloctylamine, dimethyldecylamine, dimethyllaurylamine, dimethylmyristylamine, dimethylpalmitylamine, dimethylstearylamine, dilaurylmonomethylamine, tributylamine, trioctylamine, and N,N-dimethylaniline; and quaternary ammonium, e.g., tetrabutylammonium ion, tetrahexylammonium ion, dihexyldimethylammonium ion, dioctyldimethylammonium ion, hexatrimethylammonium ion, octatrimethylammonium ion, dodecyltrimethylammonium ion, hexadecyltrimethylammonium ion, stearyltrimethylammonium ion, docosenyltrimethylammonium ion, cetyltrimethylammonium ion, cetyltriethylammonium ion, hexadecylammonium ion, tetradecyldimethylbenzylammonium ion, stearyldimethylbenzylammonium ion, dioleyldimethylammonium ion, N-methyldiethanollaurylammonium ion, dipropanolmonomethyllaurylammonium ion, dimethylmonoethanollaurylammonium ion, polyoxyethylenedodecylmonomethylammonium ion, and quaternized alkylaminopropylamine. Furthermore, examples thereof include amino acid derivatives, e.g., leucine, cysteine, phenylalanine, tyrosine, aspartic acid, glutamic acid, lysine, 6-aminohexylcarboxylic acid, 12-aminolaurylcarboxylic acid, N,N-dimethyl-6-aminohexylcarboxylic acid, N-n-dodecyl-N,N-dimethyl10-aminodecylcarboxylic acid, and dimethyl-N-12aminolaurylcarboxylic acid; nitrogen-containing heterocyclic compounds, e.g., pyridine, pyrimidine, pyrrole, imidazole, proline, γ-lactam, histidine, tryptophan, and melamine; polymers selected from quaternary salts of polymers having amino groups, e.g., poly(diallyldimethylammonium chloride), ionene polymers, poly-N-alkylacrylamide quaternary salts, and polyethyleneamine quaternary salts; and cationic polymers, e.g., copolymers with nonionic monomers.

In the method for producing the organic-inorganic complex according to the present invention, the positively charged organic compound is intercalated together with the condensate of dehydrated layered silicate. At that time, the layered silicate having a polytype exhibits regularity in the lamination azimuth. Therefore, the intercalation of organic molecules reflects the regularity so as to become stepwise.

For example, regarding mica minerals and mica clay minerals, in lamination of silicate layers, there are some azimuths of hydrogen bonds between bottom oxygen of tetragonal sheets and OH⁻ of octagonal sheets and azimuths of displacement of tetragonal sheets sandwiching octagonal sheets, wherein the energy levels are equal but the crystalline structures are geometrically different depending on the azimuths. Therefore, three-dimensionally different crystalline structures may result depending on the azimuth of lamination chosen from possible azimuths (there are polytypes).

In the case of bilaterally repeated monoclinic two-layer structure ($2M_1$) of 120° which is frequently observed regarding the mica clay minerals, when a treatment of mixing with an aqueous solution containing a positively charged organic compound (hereafter referred to as an "organic treatment") is conducted after the dehydration treatment, the positively charged organic compound is intercalated between alternate silicate layers so as to form a regular type mixed layer in which organic modification layers and unmodified layers are alternately regularly laminated. When the organic treatment is further continued, the positively charged organic compound is then intercalated into the unmodified layers, so that an organic-inorganic complex in which almost all interlayer portions are subjected to organic modification can be obtained. The mixed layer structure in the organic-inorganic complex according to the present invention can be obtained at an intermediate stage of the above-described treatment process.

The above-described organic-inorganic complex according to the present invention is dispersed in a polymeric material and, thereby, is used as a filler for a polymeric composite material. The content of the organic-inorganic complex in the polymeric material is 0.1 to 40 percent by mass, and preferably within the range of 1.0 to 10 percent by mass. If the content is less than 0.1 percent by mass, satisfactory effects of enforcing the polymeric material and improving the performance cannot be obtained. If the content exceeds 40 percent by mass, the dispersibility of the organic-inorganic complex may be impaired.

The polymeric composite material according to the present invention is characterized in that the organic modification layers of the organic-inorganic complex are peeled in the polymer matrix and are dispersed while distances between particles are 3.0 nm or more. In more preferable state, distances between particles are 6.0 nm or more. This distance increases until a state of single layer peeling is reached finally. If the distances between particles of the peeled organic modification layers are less than 3.0 nm, good dispersion state cannot be obtained and, therefore, effects of improving the dynamic characteristics of the material and improving the barrier property become insufficient. In the case where all interlayer portions are subjected to organic modification, one layered silicate layer is assumed to be one particle. In the case of a mixed layer composed of organic modification layers and unmodified layers, the unmodified layers (laminated sheet composed of one set of several layers) are assumed to be one particle.

Examples of polymeric materials constituting the polymeric composite material according to the present invention include thermosetting polymeric materials, energy line curable polymeric materials, and thermoplastic polymeric materials. However, any polymeric material is employed, and the polymeric material is not specifically limited.

The thermosetting polymeric materials used for the present invention are so-called thermosetting resins.

Specific examples thereof include urethane resins, unsaturated polyester resins, epoxy resins, phenol resins, silicone resins, melamine derivatives (for example, hexamethoxymelamine, hexabutoxylated melamine, and condensed hexamethoxymelamine), urea compounds (for example, dimethylol urea), bisphenol A compounds (for example, tetramethylol.bisphenol A), oxazoline compounds, and oxetane compounds. These thermosetting resins can be used alone or at least two types can be used in combination. These thermosetting polymeric materials include oligomers before they are cured. That is, the thermosetting polymeric material according to the present invention is a generic name for the materials before curing and after curing.

Preferably, the thermosetting polymeric material used for the present invention is an epoxy resin. Specific examples of epoxy resins include bisphenol A epoxy resins, hydrogenated bisphenol A epoxy resins, brominated bisphenol A epoxy resins, bisphenol F epoxy resins, novolac epoxy resins, phenol novolac epoxy resins, cresol novolac epoxy resins, N-glycidyl epoxy resins, novolac epoxy resins of bisphenol A, chelate epoxy resins, glyoxal epoxy resins, amino-containing epoxy resins, rubber-modified epoxy resins, dicyclopentadienephenolic epoxy resins, silicone-modified epoxy resins, and ε-caprolactone-modified epoxy resins, which are epoxy compounds having at least one epoxy group in the molecule.

In order to provide flame retardancy, substances having structures in which halogen, e.g., chlorine or bromine, or an atom, e.g., phosphorus, is contained so as to become in a bonding state not easily decomposed by heat or water may be used. Furthermore, bisphenol S epoxy resins, diglycidyl phthalate resins, heterocyclic epoxy resins, bixylenol epoxy resins, biphenyl epoxy resins, and tetraglycidylxylenoylethane resins may be used. These epoxy resins can be used alone or at least two types can be used in combination.

Two-part liquid mixture type cast polymeric material, which is composed of a base compound containing uncured oligomer component, e.g., an epoxy resin, an urethane resin (including urethane rubber), or a silicone resin, and a curing agent containing a component for curing the uncured oligomer component, and an adhesive or a paint can also constitute the polymeric composite material according to the present invention. In this case, the organic-inorganic complex is blended into at least one of the base compound and the curing agent, and the polymeric composite material according to the present invention can be obtained by mixing the base compound and the curing agent and conducting thermosetting treatment.

The energy line curable polymeric material used for the present invention is a polymeric material which is cured by an active energy line, e.g., visible light, an ultraviolet ray, an electron beam, a gamma ray, or an X ray, and is a generic name for polymeric materials in a photosensitive prepolymer state before curing and polymeric materials after curing. It is preferable that the photosensitive prepolymer used for the present invention has ethylenic unsaturated terminal groups derived from an acrylic monomer.

Here, the acrylic monomer is acrylic acid or methacrylic acid (hereafter acrylic acid and methacrylic acid are collectively called "(meth)acrylic acid") or a derivative thereof, e.g., an alkyl ester or a hydroxyalkyl ester. Examples of such photosensitive prepolymers include polyester (meth)acrylate, epoxy(meth)acrylate, urethane (meth)acrylate, polybutadiene (meth)acrylate, silicone (meth)acrylate, and melamine(meth)acrylate. Most of all, epoxy(meth)acrylate and urethane (meth)acrylate are preferable.

In general, these energy line curable polymeric materials are often used together with photopolymerization initiators. Examples of photopolymerization initiators can include benzophenones, e.g., benzophenone, benzoylbenzoic acid, 4-phenylbenzophenone, hydroxybenzophenone, and 4,4'-bis(diethylamino)benzophenone; benzoin alkyl ethers, e.g., benzoin, benzoin ethyl ether, benzoin isopropyl ether, benzoin butyl ether, and benzoin isobutyl ether; acetophenones, e.g., 4-phenoxydichloroacetophenone, 4-t-butyl-dichloroacetophenone, 4-t-butyl-trichloroacetophenone, diethoxyacetophenone, and 2-benzyl-2-dimethylamino-1-(4-morpholinophenyl)-butanone-1; thioxanthenes, e.g., thioxanthene, 2-chlorothioxanthene, 2-methylthioxanthene, and 2,4-dimethylthioxanthene; alkylanthraquinones, e.g., ethylanthraquinone and butylanthraquinone; and acylphosphine oxides, e.g., 2,4,6-trimethylbenzoyldiphenylphosphine oxide. They can be used alone or as a mixture of at least two types. Furthermore, a photosensitizer can be used in combination, if necessary.

Two-part liquid mixture type cast polymeric material, which is composed of a energy line curable polymeric material and a thermosetting polymeric material, e.g., an epoxy resin, an urethane resin (including urethane rubber), or a silicone resin, can also constitute the polymeric composite material according to the present invention. In this case, the organic-inorganic complex is blended into at least one of the energy line curable polymeric material and the thermosetting polymeric material and, thereby, the polymeric composite material in which the organic-inorganic complex is dispersed favorably can be obtained after conducting a final curing treatment.

Examples of thermoplastic polymeric materials to be used for the present invention include polyolefin resins, e.g., high density polyethylene, low density polyethylene, linear low density polyethylene, polypropylene, ethylene-propylene copolymer, ethylene-butene copolymer, ethylene-hexene copolymer, ethylene-vinyl acetate copolymer, ethylene-methacrylate copolymer, and ionomer resin; styrene, acrylonitrile resins, e.g., polystyrene, styrene-acrylonitrile copolymer, styrene-acrylonitrile-butadiene copolymer, polyacrylonitrile, and styrene-ethylene-butene ternary copolymer; halogen-containing resins, e.g., polyvinyl chloride, polyvinylidene chloride, and polyvinylidene fluoride; polyamide resins and copolymers thereof, e.g., polycarbonate, polyacetal, polyamide 6, polyamide 66, polyamide 11, polyamide 12, aromatic polyamide, and polymethacrylic imide; polyester resins, e.g., polyethylene terephthalate, polybutylene terephthalate, polyethylene naphthalate, aliphatic polyester, and aromatic polyester; polyphenylene ether; polyphenylene sulfide; polysulfone resin; and biodegradable resins, e.g., polylactic acid, biodegradable aliphatic polyester, and polycaprolactone. They may be used alone or at least two types may be combined into polymer alloys. Furthermore, other fibrous, whisker-like, or spherical inorganic fillers may be contained.

Regarding the method for mixing the organic-inorganic complex according to the present invention with the thermosetting polymer or the energy line curable polymer, specifically, it is possible that the above-described individual components are mixed and, thereafter, melt-kneading is conducted. For example, production can be conducted through melt-kneading by using a known kneading method, e.g., Banbury mixer, Brabender, kneader, roll, uniaxial or multiaxial extruder, or Ko-Kneader. Regarding an uncured polymeric composite material diluted with a solvent or the like so as to reduce the viscosity at room temperature to the ink-like state, production can also be conducted by a known kneading method, e.g., a triple roller mill or a beads mill.

Regarding the method for melt-kneading the organic-inorganic complex according to the present invention with the thermoplastic polymer, preferably, the above-described individual components are mixed and, thereafter, melt-kneading is conducted. For example, production can be conducted through melt-kneading by using a known kneading method, e.g., Banbury mixer, Brabender, kneader, roll, uniaxial or multiaxial extruder, or Ko-Kneader.

EXAMPLES

Figure 1:
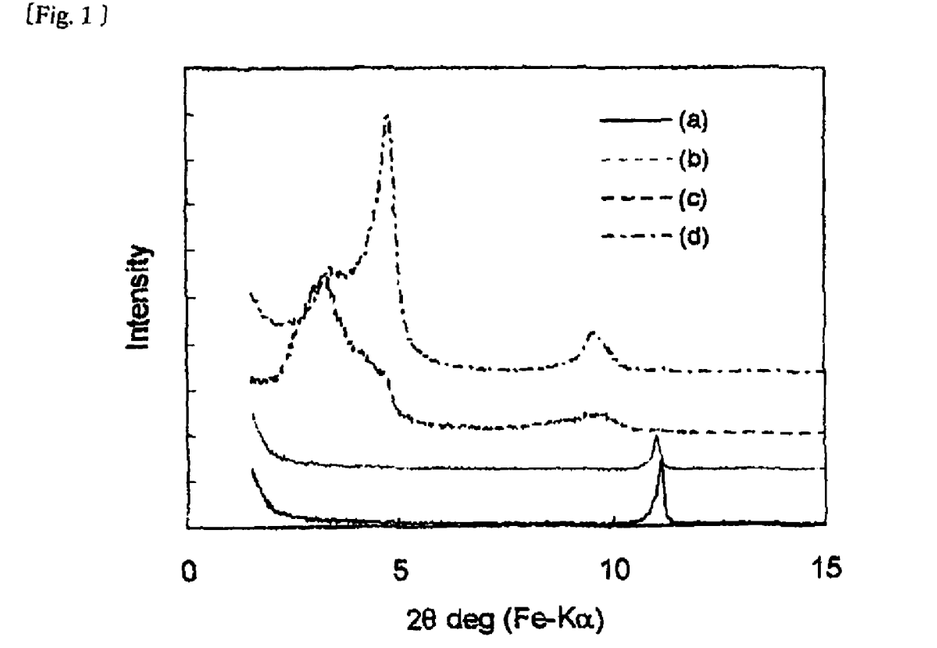
FIG. 1 is a graph showing the results of the XRD measurement of the sample obtained in Example 1.
Figure 2:
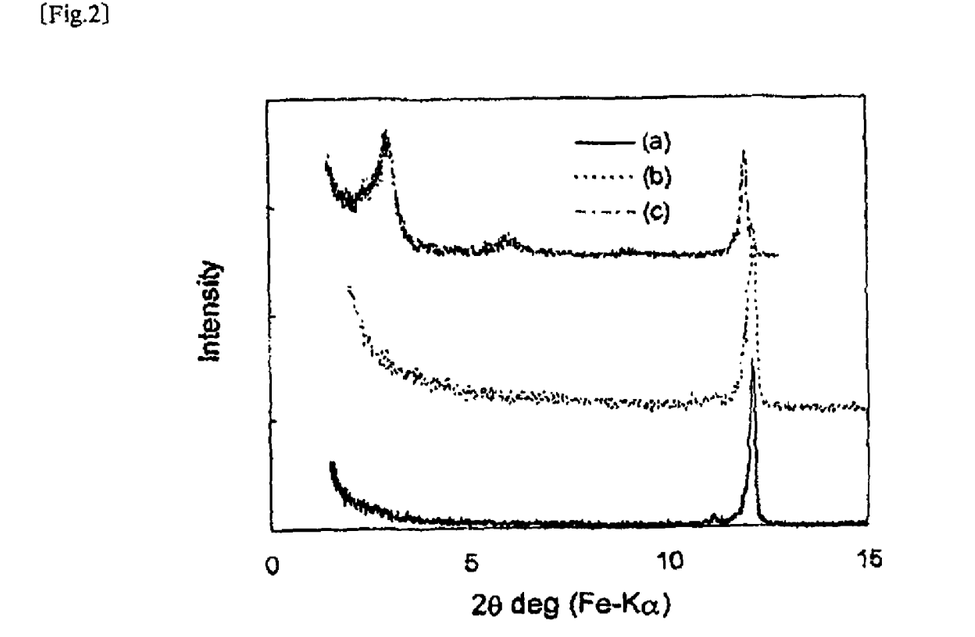
FIG. 2 is a graph showing the results of the XRD measurement of the sample obtained in Example 2.
Figure 3:
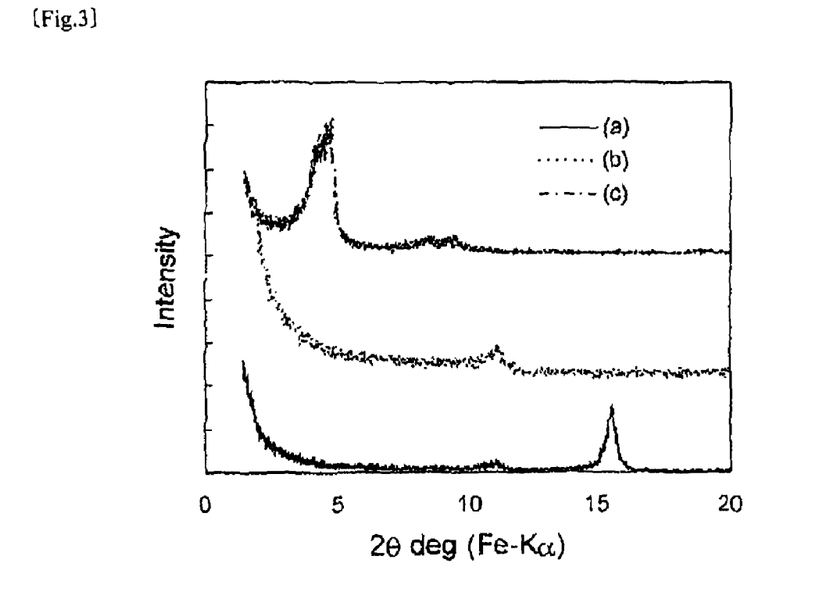
FIG. 3 is a graph showing the results of the XRD measurement of the sample obtained in Example 3.

The examples of the present invention will be described below. However, the present invention is not limited to these examples. As for the hydrous layered silicate, a mica clay mineral: natural sericite (FSN, produced by Sanshin Mining and Manufacturing Co., Ltd.) was used. A powder X-ray diffraction (XRD) measurement was conducted and, as a result, the value of the interlayer distance: $d_{001}$ was 1.0 nm (FIG. 1a). As for the hydrous layered silicate having a 2:1 layer exhibiting no layer charge, pyrophillite was used. The value of the interlayer distance: $d_{001}$ was 0.92 nm (FIG. 2a). As for the hydrous layered silicate having a 1:1 layer exhibiting no layer charge, kaolinite (KC-1 kaolin, produced by Shokozan Mining Co., Ltd.) was used. The value of the interlayer distance: $d_{001}$ was 0.7 nm (FIG. 3a).

Example 1

[Preparation of Organic-Inorganic Complex 1]

A natural sericite powder FSN was put into a crucible, and a dehydration treatment was conducted in an electric furnace at 800° C. for 1 hour. Dodecylamine hydrochloride (produced by TOKYO KASEI KOGYO CO., LTD.) serving as a positively charged organic compound was dissolved into pure water so as to prepare a 0.05 M solution. Subsequently, 100 g of dehydrated FSN powder was put into 6 L of the resulting dodecylamine hydrochloride aqueous solution, followed by agitation. Thereafter, agitation was conducted at 60° C. for 12 hours or for 2 days, followed by filtration, washing, and drying, so that Organic-inorganic complex 1-12H and Organic-inorganic complex 1-2d, respectively, were prepared.

The results of the XRD measurement of the resulting sample are shown in FIG. 1. The bottom surface reflection (001) of the FSN sample after the heat treatment was slightly weakened because of dehydration (Curve b). Regarding the powder sample treated with dodecylamine for 2 hours, almost no unswelled layer remained, and broad bottom surface reflection of 3.3 nm appeared at 2θ=about 3.3°. This indicates that long period reflection of unmodified layers (bottom surface distance 1 nm) and organic modification layers (bottom surface distance 2.3 nm) due to dodecylamine are shown and Organic-inorganic complex 1-12H is a regular type mixed layer in which these layers are laminated one after the other by turns (Curve c). Regarding Organic-inorganic complex 1-2d treated for 2 days, sharp bottom surface reflection ($d_{001}$=2.3 nm) begins to appear at 2θ=4.8°. This indicates that dodecylamine is intercalated into unmodified layers as well, and shift to a single phase of organic modification layers (bottom surface distance 2.3 nm) proceeds (Curve d).

Example 2

[Preparation of Organic-Inorganic Complex 2]

A pyrophillite powder was put into a crucible, and a dehydration treatment was conducted in an electric furnace at 650° C. for 1 hour. The dehydrated pyrophillite powder was put into 0.05 M aqueous solution of dodecylamine hydrochloride, and an agitation treatment was conducted at 70° C. for 4 days, so that Organic-inorganic complex 2 was prepared.

The results of the XRD measurement of the resulting sample are shown in FIG. 2. Regarding the pyrophillite, very sharp 001 reflection (0.92 nm) appeared at 2θ=12.1° (Curve a), and after the heat treatment, the bottom surface reflection became slightly broader (Curve b). Regarding the sample treated with dodecylamine, bottom surface reflection of 0.92 nm with reduced peak intensity and broad low angle reflection (2.6 nm) in the vicinity of 2θ=4.2° were ascertained. Therefore, it was made clear that a mixture of unswelled layers in part and layers in which organic molecules were intercalated was formed (Curve c). This indicates that even a 2:1 type layered silicate exhibiting no layer charge can form an organic-inorganic complex.

Example 3

[Preparation of Organic-Inorganic Complex 3]

A kaolinite powder was put into a crucible, and a dehydration treatment was conducted in an electric furnace at 600° C. for 30 minutes. The dehydrated kaolinite powder was put into 0.05 M aqueous solution of dodecylamine hydrochloride, and an agitation treatment was conducted at 70° C. for 2 days, so that Organic-inorganic complex 3 was prepared.

The results of the XRD measurement of the resulting sample are shown in FIG. 3. After the heat treatment, the bottom surface reflection of kaolinite almost disappeared (Curve b). Regarding the sample subjected to the organic treatment: Organic-inorganic complex 3, bottom surface reflection of 2.3 to 2.6 nm appeared in the vicinity of 2θ=4° (Curve c). This indicates that dodecylamine was intercalated between layers of the kaolinite.

Example 4

In Example 1, Organic-inorganic complex 1-12H was mixed with polyamide-6 (NOVAMID1010C2, produced by Mitsubishi Engineering-Plastics Corporation), melt-kneading was conducted at 260° C. by using a mixer unit of Labo Plastomill (produced by Toyo Seiki Seisaku-sho, Ltd.), so as to prepare a polymeric composite material. The content of Organic-inorganic complex 1-12H in the resulting polymeric composite material was 5 percent by mass. This sample was pressed with a pressure at 260° C., so as to prepare a film compact having a thickness of 200 μm.

Figure 4:
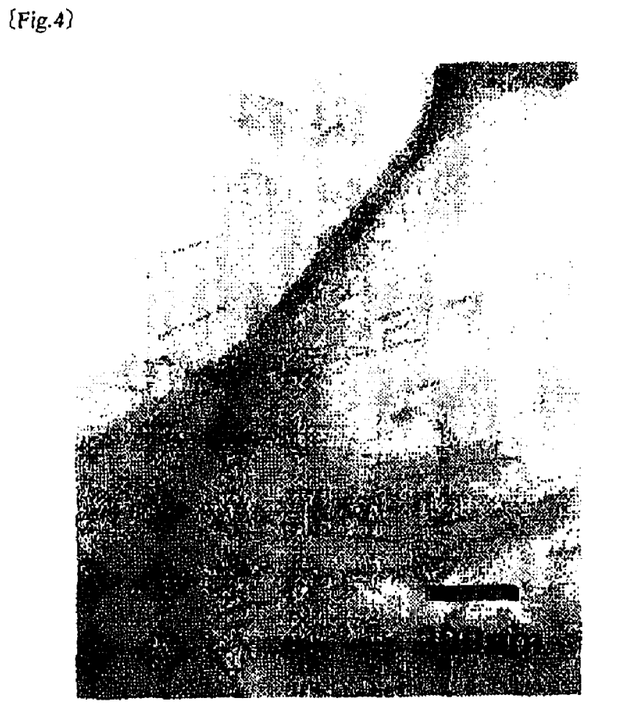
FIG. 4 is a photograph substituted for a drawing, showing a TEM image of the organic sericite-polyamide 6 composite material obtained in Example 1.

As a result of the XRD measurement of the resulting sample, the bottom surface reflection became broad. As a result of the XRD measurement, the bottom surface reflection ($d_{001}$ value=3.3 nm) indicating the lamination structure of the organic complex disappeared. A very thin section of about 90 nm was prepared from the oriented sample with an ultramicrotome (ULTRACUT UCT, Leica), and the dispersion state of Organic-inorganic complex 1-12H was observed with a transmission electron microscope TEM (JEM1010, JEOL LTD.) at an acceleration voltage of 100 kV. As a result, the state in which sericite sheets, each composed of one set of several layers, were peeled and dispersed in a polyamide-6 matrix was ascertained (FIG. 4).

Comparative Example 1

The same treatment as in Example 1 was conducted except that the heat treatment at 800° C. for 1 hour was not conducted. As a result of the XRD measurement, regarding the sample treated for 6 hours, very weak bottom surface reflection of 2.3 nm and very intense bottom surface reflection of 1.0 nm appeared. Regarding the sample treated for 2 days, the bottom surface reflection of 2.3 nm increased slightly, but intense bottom surface reflection of 1.0 nm remained. Consequently, dodecylamine hydrochloride was not sufficiently intercalated between layers of FSN.

Comparative Example 2

The same treatment as in Example 2 was conducted except that the heat treatment at 650° C. for 1 hour was not conducted. As a result of the XRD measurement, very intense bottom surface reflection of 0.93 nm appeared. Therefore, it was made clear that dodecylamine hydrochloride was not intercalated between layers of pyrophillite.

Comparative Example 3

The same treatment as in Example 3 was conducted except that the heat treatment at 600° C. for 30 minutes was not conducted. As a result of the XRD measurement, very intense bottom surface reflection of 0.7 nm appeared. Therefore, it was made clear that dodecylamine hydrochloride was not intercalated between layers of kaolinite.

INDUSTRIAL APPLICABILITY

The present invention relates to a method for production of an organic-inorganic complex by easily intercalating a positively charged organic compound into a non-swellable, hydrous layered silicate having a hydroxyl group in its crystalline structure, the organic-inorganic complex, and a polymeric composite material containing the organic-inorganic complex. The organic-inorganic complex according to the present invention can select various host layered silicates and, therefore, can be applied to wide fields, e.g., cosmetics, paints, and fillers for plastic.

Since an organic-inorganic complex having a regular type mixed layer structure can be produced by controlling the production process, creation of new functional materials can be expected. For example, if functional molecules or substances intercalated into a swellable layer are present between silicate layers (non-swellable unit), each composed of one set of several layers, an organic-inorganic hybrid material exhibiting excellent light resistance and excellent heat resistance can be obtained. As described above, usefulness as a host agent for a functional organic-inorganic hybrid material is expected.

The invention claimed is:

1. A method for producing an organic-inorganic complex by intercalation of a positively charged organic compound between layers of a layered silicate, the method characterized by comprising the steps of heat-treating a hydrous layered silicate having a hydroxyl group in its crystalline structure at a temperature not higher than 1,200° C. and lower than the phase transition temperature of the silicate to dehydrate the silicate in Step (I); and allowing the dehydrated layered silicate to contact an aqueous solution containing a positively charged organic compound in Step (II).

2. The method for producing an organic-inorganic complex according to claim 1, characterized in that the hydrous layered silicate having a hydroxyl group in its crystalline structure is represented by the following general formula (1):

(where $0.2 \leq a \leq 1.0$, $0 \leq b \leq 0.1$, $0 \leq c \leq 3$, $0 \leq d \leq 2$, $2 \leq c+d \leq 3$, $0 \leq e < 4$, and $0.6 \leq f \leq 2$ are satisfied, M is a cation other than K present between layers and is at least one of Li, Na, Rb, Cs, $NH_4$, Be, Mg, Ca, Sr, Ba, Mn, Fe, Ni, Cu, Zn, and Al, $M^1$ and $M^2$ are metals which enter an octahedron coordinating with $O^{2-}$ and $OH^-$ and constituting the crystalline structure of the hydrous layered silicate, $M^1$ is at least one of Mg, Fe, Mn, Cu, Ni, Zn, and Li, and $M^2$ is at least one of Al, Fe, Mn, and Cr).

3. The method for producing an organic-inorganic complex according to claim 2, characterized in that the layered silicate having a hydroxyl group in its crystalline structure is a layered silicate belonging to any one of groups of vermiculites, mica, mica clay minerals, brittle mica, and chlorite.

4. The method for producing an organic-inorganic complex according to claim 1, characterized in that the layered silicate having a hydroxyl group in its crystalline structure is represented by the following general formula (2) or general formula (3):

(In the formula, $M^3$ represents one type selected from metal elements of iron, aluminum, manganese, chromium, nickel, zinc, cobalt, titanium, calcium, sodium, and potassium, $M^4$ represents one type selected from metal elements of $Fe^{2+}$, $Fe^{3+}$, Mg, and Ti, and e, f, g, and h are numbers satisfying the relationships of $0 \leq e \leq 2$, $0 \leq f \leq 1$, $0 \leq g \leq 1$, and $0 \leq h \leq 1$).

5. The method for producing an organic-inorganic complex according to claim 4, characterized in that the layered silicate having a hydroxyl group in its crystalline structure is a layered silicate belonging to any one of groups of talc and pyrophillite.

6. The method for producing an organic-inorganic complex according to claim 1, characterized in that the layered silicate having a hydroxyl group in its crystalline structure is represented by the following general formula (4) or general formula (5):

7. The method for producing an organic-inorganic complex according to claim 6, characterized in that the layered silicate having a hydroxyl group in its crystalline structure is a 1:1 type layered silicate typified by a kaolin mineral or a serpentine mineral.

8. The method for producing an organic-inorganic complex according to claim 1, characterized in that the positively charged organic compound is at least one type selected from primary amines, secondary amines, and tertiary amines, each having the carbon number of 8 to 150, and salts thereof; quaternary ammonium salts; and amine compounds, amino acid derivatives, and nitrogen-containing heterocyclic compounds and salts thereof.

9. An organic-inorganic complex produced by the method according to claim 1.

10. The organic-inorganic complex according to claim 9, characterized in that the organic-inorganic complex comprises a mixed layer structure formed by laminating layers (A) in which a positively charged organic compound is intercalated and layers (B) in which a positively charged organic compound is not intercalated.

11. A polymeric composite material characterized by comprising 0.1 to 40 percent by mass of the organic-inorganic complex according to claim 9 as a filler in a polymeric material.

12. The polymeric composite material according to claim 11, characterized in that the layers, in which a positively charged organic compound is intercalated, of the organic-inorganic complex are peeled in the polymeric material and layered silicate layers are dispersed while distances between particles are 3.0 nm or more.

* * * * *